(12) United States Patent
Barber (10) Patent No.: US 8,263,200 B2
(45) Date of Patent: Sep. 11, 2012

(54) COMPOSITE STRUCTURE AND RELATED METHOD TO OBTAIN IT

(75) Inventor: Scott Barber, East Cowes (GB)

(73) Assignee: GKN Aerospace Services Limited, Hampshire (GB)

( * ) Notice: Subject to any disclaimer, the term of this patent is extended or adjusted under 35 U.S.C. 154(b) by 425 days.

(21) Appl. No.: 12/675,267

(22) PCT Filed: Aug. 29, 2008

(86) PCT No.: PCT/GB2008/002924
§ 371 (c)(1),
(2), (4) Date: Feb. 25, 2010

(87) PCT Pub. No.: WO2009/027684
PCT Pub. Date: Mar. 5, 2009

(65) Prior Publication Data
US 2010/0206994 A1    Aug. 19, 2010

(30) Foreign Application Priority Data
Aug. 30, 2007  (GB) .................................. 0716872.7

(51) Int. Cl.
*B29D 22/00* (2006.01)
*B29D 23/00* (2006.01)
*B32B 1/08* (2006.01)

(52) U.S. Cl. ..................... 428/36.9; 428/34.1; 428/34.5; 428/36.1; 156/285; 244/53 R; 244/53 B (58) Field of Classification Search .................. 156/196, 156/245, 264, 285; 264/163, 236, 257; 244/53 R, 244/53 B; 428/34.1, 34.5, 36.1, 36.9
See application file for complete search history.

(56) References Cited

FOREIGN PATENT DOCUMENTS

| EP | 0 064 151 A | 11/1982 |
|---|---|---|
| EP | 0 202 041 A | 11/1986 |
| EP | 0 410 599 A | 1/1991 |
| WO | 2006/119002 A | 11/2006 |

OTHER PUBLICATIONS

International Search Report and Written Opinion for PCT/GB2008/002924 under date of Nov. 25, 2008.

*Primary Examiner* — Michael C Miggins
(74) *Attorney, Agent, or Firm* — Quarles & Brady LLP (57) ABSTRACT

A method of making a composite structure (1) that comprises a curved body (5) and an integral rim (3) extending from an end of the curved body. The method comprises the steps of: forming a diaphragm pack (19) comprising a flat stack (13) of composite plies between two diaphragms (15 A, 15B), wherein each ply (L1, L2, L3) of the flat stack (13) is made up of a plurality of composite tiles (9). Each tile (9) includes at least a first portion (9A) and a second portion (9B) that have side edges of the first portion (9A) configured to abut against side edges of adjacent tiles and side edges of the second portion (9B) configured to overlap side edges of adjacent tiles. Air is evacuated from within the diaphragm pack (19) either before or after placing the diaphragm pack (19) within a double diaphragm forming apparatus comprising a hollow forming tool (23), wherein the first portion (9A) of the composite tiles (9) is supported on an upper surface (23 A) of the tool (23). Heat (25) is applied to the diaphragm pack (19); when the stack reaches the forming temperature a vacuum (Pv) is applied between the lower diaphragm (15B) and the hollow forming tool (23) such the second portion (9B) of the composite tiles (9) are drawn downwards into contact with the internal wall (23B) of the forming tool (23) to move the edges of the second portion (9B) of adjacent tiles to abut against side edges of adjacent tiles (9). The first portion (9A) of each tile (9) forms part of the rim (3) and the second portion (9B) of each tile forms art of the curved body (5).

21 Claims, 10 Drawing Sheets

COMPOSITE STRUCTURE AND RELATED METHOD TO OBTAIN IT

CROSS REFERENCE TO RELATED APPLICATIONS

This application represents the national stage application of International Application PCT/GB2008/002924 filed 29 Aug. 2008, which claims the benefit of Great Britain Patent Application 0716872.7 filed 30 Aug. 2007, which are incorporated herein by reference in their entirety for all purposes.

FIELD

The invention relates to a method of making a composite structure. In particular, the invention relates to a method of making a composite structure that comprises a curved body and an integral rim extending from an end of the body.

BACKGROUND

In the aerospace industry, over recent times carbon fibre reinforced composites (for example composites containing carbon fibres and epoxy resin) have become an increasingly attractive alternative to metal for many aircraft components. The carbon fibre reinforced composite material offers improved properties such as lower weight, improved fatigue/damage resistance, corrosion resistance and negligible thermal expansion.

In aerospace applications ducts (for example an aero-engine duct or nacelle) that include a flange to facilitate connecting sections of the duct to each other and to mount engine components to the duct are commonly made from metal. An example of a conventional flange is a disc shaped rim formed on the end of pipes and shafts for coupling them together. Conventionally, flanges are included on, for example, metallic hollow structures such as pipes for joining two such structures together or for joining a hollow structure to surrounding structural elements, for example a flange on an aero-engine duct or nacelle facilitates attaching sections of the duct to each other and for mounting engine components to the engine housing.

To produce a flange that forms a disc shaped rim on a hollow structure from composite materials involves complex manufacturing processes due to the importance of maintaining uniformity of fibre alignment and the importance of keeping any discontinuities due to creasing etc or voids in the composite structure to a minimum, in particular, in a flange that is to be used in a load bearing application because any such faults would likely produce a product having inferior properties to those that the component was designed for.

Figure 10A:
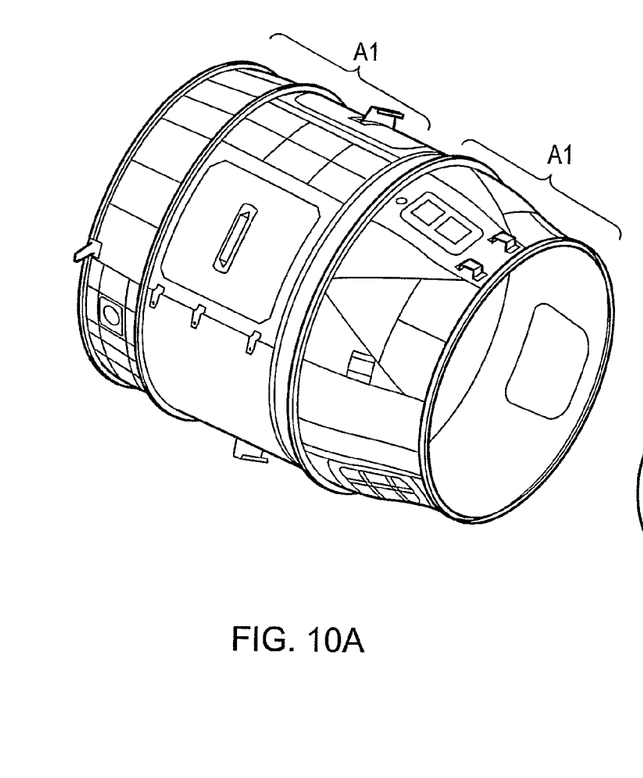
FIG. 10A is a perspective view of an outer bypass duct of an aircraft engine.
Figure 10B:
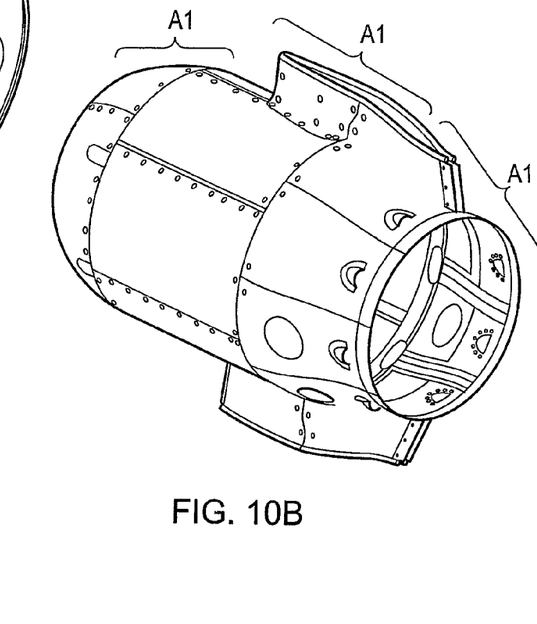
FIG. 10B is a perspective view of an inner duct for an aircraft engine.

Due to the complexities in manufacturing a duct with an integral flange from composite material, such components for use in aerospace applications (for example as an aero-engine duct or nacelle) are commonly made from metal. FIGS. 10A and 10B illustrate an outer engine duct and an inner engine duct respectively showing examples of sections of the duct that are joined together at adjacent flanges indicated by reference A1.

SUMMARY

The present invention is directed to a method of making a composite structure comprising a curved body and an integral rim extending from an end of the curved body, the method comprises:

forming a diaphragm pack comprising a flat stack of composite plies between two diaphragms, wherein each ply of the flat stack is made up of a plurality of composite tiles, each tile having at least a first portion and a second portion, with side edges of the first portion being configured to abut against side edges of adjacent tiles and side edges of the second portion being configured to overlap side edges of adjacent tiles;

placing the diaphragm pack in a double diaphragm forming apparatus comprising a hollow forming tool, including evacuating air from within the diaphragm pack, wherein the first portion of the composite tiles is supported on an upper surface of the tool;

applying heat to the diaphragm pack; and applying a vacuum between the lower diaphragm and the hollow forming tool such that:

an unsupported region corresponding to the second portion of the composite tiles is drawn into contact with an internal wall of the forming tool;

the edges of the second portion of adjacent tiles move to abut against side edges of adjacent tiles;

the first portion of each tile forms part of the rim; and the second portion of each tile forms part of the curved body.

Such a method can enable a hollow duct to be produced from composite materials with an integral flange on one end. Accordingly the flange allows the composite structure to be coupled to similar structures. The composite structure could, for example, be used as part of aero-engine housing or nacelle wherein the flange may facilitate attaching sections of the housing or nacelle together and/or may facilitate connecting engine components to the housing.

To form a hollow duct the tiles are first laid flat and subsequently to lay-up the second section of the tiles are drawn into contact with the internal wall of a hollow forming tool to form the curved body with the first portion of the tiles providing the integral flange. The first portion of the tiles undergoes little or no deformation during the forming process. Therefore, when laid in a flat stack the side edges of the first portion abut against the side edges of adjacent tiles. To make a composite structure with a circular flange the first portion of each tile has radial edges that abut against side edges of adjacent tiles. The hollow duct may be of any shape, for example, cylindrical with parallel or tapered walls or barrelled, where the walls bulge outwards. The cross-sectional shape may be any shape, for example circular or elliptical. It will be appreciated that the cross-sectional shape of the hollow duct and the periphery of the flange or rim will influence the overall shape of each tile. For example, for a cylinder of circular cross-section with parallel sides the side edge of the second portion of each tile may be parallel. When laid in a circular pattern the side edges of the second portion will overlap and when drawn into contact with the internal wall of a hollow forming tool the side edges of the second portion of adjacent tiles will abut to form the body of the composite duct with an integral flange or rim. The shape of the first portion of the tiles for a circular flange could be a curved edge that corresponds with a section of the greater circle formed by joining a number of tiles together and side edges that are tapered at an angle that defines a radius of the circle.

In the final structure the abutting edges of adjacent tiles can reduce the occurrence of voids between layers or any discontinuities in the composite structure.

To avoid the occurrence of coincident abutting edges in adjacent layers, which could lead to a weakness in the composite structure, each layer forming the stack is laid relative to the previous layer such that the abutting edges between tiles is offset. This is particularly important in the region of the flange which in use may be load bearing.

The composite material used to make the composite structure according to an embodiment of the invention may be unidirectional pre-impregnated composite material. Alternatively, the material used may be pre-impregnated woven fabric. Alternatively, the material used may be dry woven fabric. The composite material may comprise dry woven fabric interleaved with resin film. Examples of suitable composite materials include carbon fibres, aramid fibres or glass fibres or a combination of carbon fibres and aramid fibres or a combination of aramid and glass fibres or a combination of carbon and glass fibres or a combination of carbon, aramid and glass fibres.

The tiles may be laid up by hand. Alternatively, the tiles may be laid-up by an automated process, which may reduce preparation time and may improve the quality of the end product compared with a product produced by hand lay-up.

The present invention may also be directed to a composite structure comprising a hollow duct and integral rim on an end thereof, wherein the duct and rim are formed from a plurality of composite tiles that include at least a first portion and a second portion, where the first portion of each tile forms part of the rim and the second portion of each tile forms part of the hollow duct and wherein edges of adjacent tiles abut one another.

BRIEF DESCRIPTION OF THE DRAWINGS

Embodiments of the present invention will now be described by way of example only with reference to the accompanying drawings in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the claimed invention.

DETAILED DESCRIPTION

Figure 1:
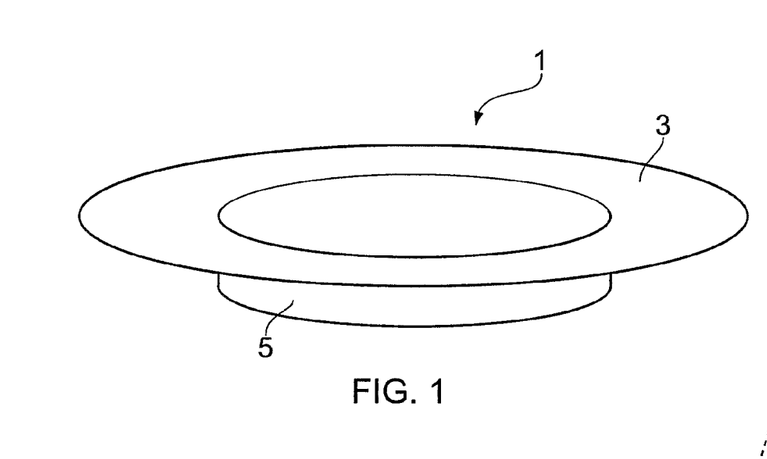
FIG. 1 is a perspective view of a hollow duct having a flange at one end.

FIG. 1 shows a perspective view of a hollow structure 1 that is produced by a method according to an embodiment of the present invention.

The hollow structure 1 is made of composite material and includes a flange 3 in the form of a rim that extends from the edge of the curved body 5 of the hollow structure 1.

Figure 2A:
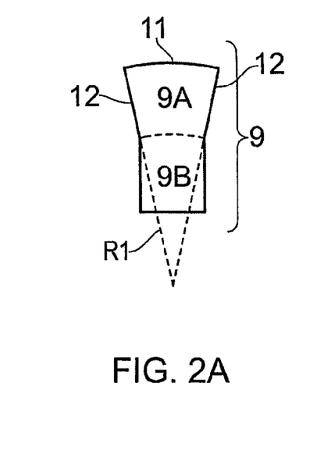
FIG. 2A is a schematic representation of a tile used in laying-up the composite material that is used to produce the duct and flange of FIG. 1.
Figure 2B:
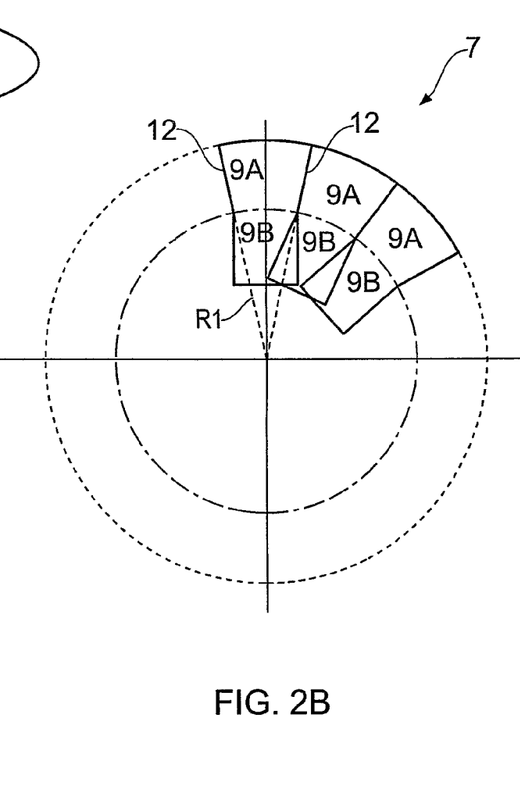
FIG. 2B is a schematic representation of three of the tiles of FIG. 2A arranged to define a curved periphery.

The hollow structure 1 is made from composite material that is prepared as a horizontal flat stack of composite plies as illustrated in FIG. 2B. Each ply of the composite stack 7 is made up of a plurality of tiles 9. Referring to FIGS. 2A and 2B, each tile 9 is substantially mushroom-shaped, where the head portion of the mushroom shape is provided by a first portion 9A that forms part of the flange (or rim) 3 on the composite structure 1 and the stalk section of the mushroom-shape is provided by a second portion 9B that provides the wall of the hollow structure 1 from which the flange 3 extends.

In the illustrated examples a cylindrical duct having a circular cross-section is illustrated. Accordingly, the first portion 9A of each tile 9 has a curved edge 11 and two straight edges 12. The two straight edges 12 as shown in FIGS. 2A and 2B trace the line of a radius R1 that is the radius of the greater circle defined by periphery of the flange 3. The curved edge 11 is in the form of an arc of the greater circle that is formed when a plurality of the tiles are arranged side by side as illustrated in FIG. 2B. The angle of inclination of each of the straight edges 12 being defined by a radius R1 of the greater circle means that when two or more tiles 9 are placed side-by-side the straight edges abut one another and a greater arc is produced. By laying a sufficient number of tiles 9 together a full circle is produced.

In the illustrated example, the hollow body 5 is cylindrical with a circular cross-section and parallel walls and the second portion 9B of each tile 9 is substantially rectangular. When the tiles 9 are laid flat as illustrated in FIG. 2B the edges of the second portion 9B of each tile 9 overlap and when making the composite hollow structure 1 as illustrated in FIG. 1 the second portion 9B is deformed relative to the first portion 9A through an angle of approximately ninety degrees. For the illustrated example, during the deformation process (when the unsupported region of the tiles is drawn into contact with the internal wall of the hollow forming tool) the side edges of the second portion 9B move from being horizontal to being vertical, where the edges of second portion 9B move from overlapping to substantially abutting against side edges of adjacent tiles. The process of making the hollow composite structure 1 is described below with reference to FIGS. 4A to 4F.

Figure 3A:
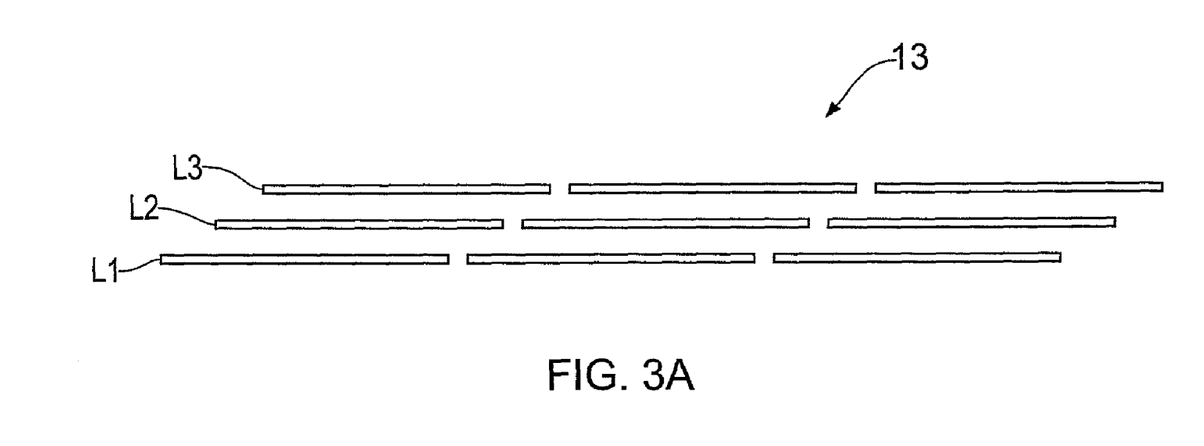
FIG. 3A is a schematic representation of the arrangement of the composite plies layered to make up the composite material to produce the composite structure of FIG. 1.
Figure 3B:
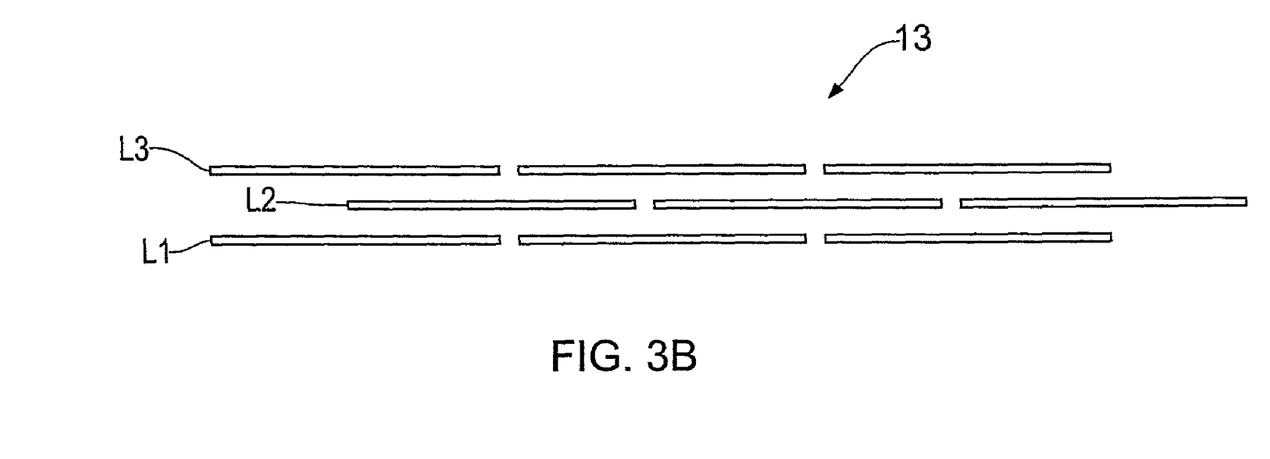
FIG. 3B is a schematic representation of an alternative stacking sequence to that illustrated in FIG. 3A.

Referring to FIGS. 3A and 3B, a composite stack 13 is produced by adding layers L2, L3 to a first layer L1, where the subsequent layers L2, L3 are laid up in the same way as illustrated and described with reference to FIG. 2B. In each layer L1, L2, L3, as illustrated in FIGS. 3A and 3B, the abutting edges of the first portion 9A of each tile 9 are offset from the abutting edges of the first portion 9A of each tile 9 in adjacent layers such that any weakness due to the abutting joints is minimised. In the examples illustrated in FIGS. 3A and 3B, three layers L1, L2, L3 are shown for illustrative purposes. However, it will be appreciated that the actual number of layers L1, L2, L3 used is determined by the material properties required from the end-product. FIGS. 3A and 3B illustrate alternative sequences of lay-up. In FIG. 3A each subsequent layer is laid offset to the right of the previous layer such that the joints between each tile do not overlap. In FIG. 3B, the layers L1, L2, L3 are arranged such that the joints in the first and third layers L1, L3 are aligned, but the second layer L2 is sandwiched between the first and third layers L1, L3 and is also offset relative to the first and third layers L21, L3 such that the joints between tiles 9 in the first and second layers L1, L2 are offset from each other and the joints between tiles 9 in the second and third layers L2, L3 are offset from each other.

Figure 4A:
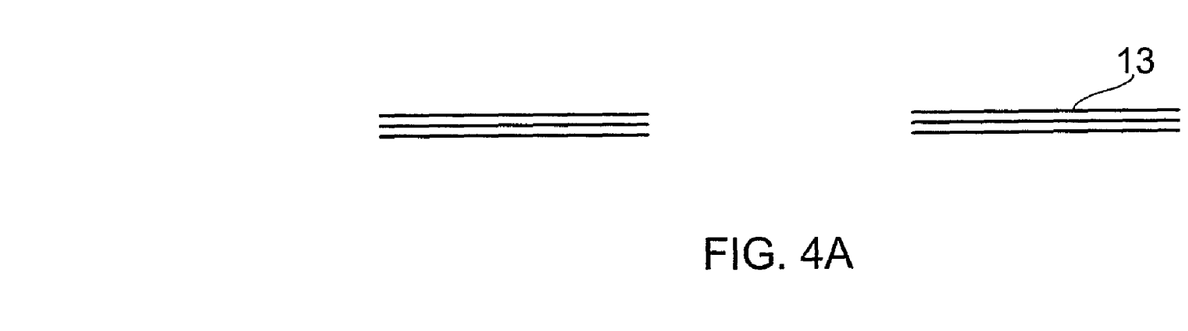
FIG. 4A is a schematic representation of a stack of composite plies to indicate the start of the method of making the duct and flange of FIG. 1.

FIGS. 4A to 4F illustrate the process of producing a three dimensional hollow composite structure 1 (see FIG. 1 and FIG. 5A) from the substantially two-dimensional stack 13 of composite plies as illustrated in FIG. 4A.

As described above with reference to FIGS. 2A and 2B, the composite stack 13 can be laid up manually or by an automated process.

Referring to FIG. 4A, each ply is stacked and arranged in a manner that will determine the material properties of the final product. The illustrated example shows three layers to indicate how the process changes the product from a flat stack to a three-dimensional structure at the end of the forming process. After lay-up is complete the stack of composite plies 13 is consolidated to remove air and to compact the stack.

Figure 4B:
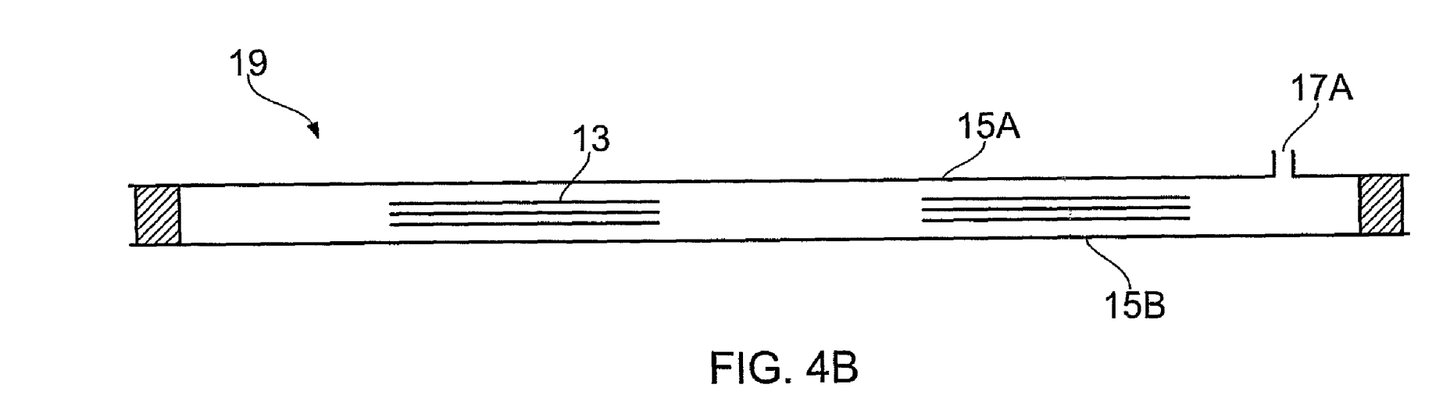
FIG. 4B shows the composite plies of FIG. 4A arranged between two diaphragms to form a diaphragm pack.

FIG. 4B shows the next stage in the forming process, where the composite stack 13 is placed between two diaphragms 15A, 15B. The diaphragms 15A, 15B may be made of nylon bagging film that has high elongation properties. An example of a suitable material is the product known as DP1000, which is an example of nylon bagging film known under the Registered Trademark IPPLON®. DP1000 is capable of four hundred and fifty percent elongation before breaking at a maximum use temperature in the region of 204-212° C.

FIG. 4B also shows that the diaphragms 15A, 15B are sealed to form a closed bag. The closed bag may have one or more vacuum ports in it. The illustrated example includes a single vacuum port 17A. The arrangement illustrated in FIG. 4B is hereinafter referred to as a diaphragm pack 19.

Figure 4C:
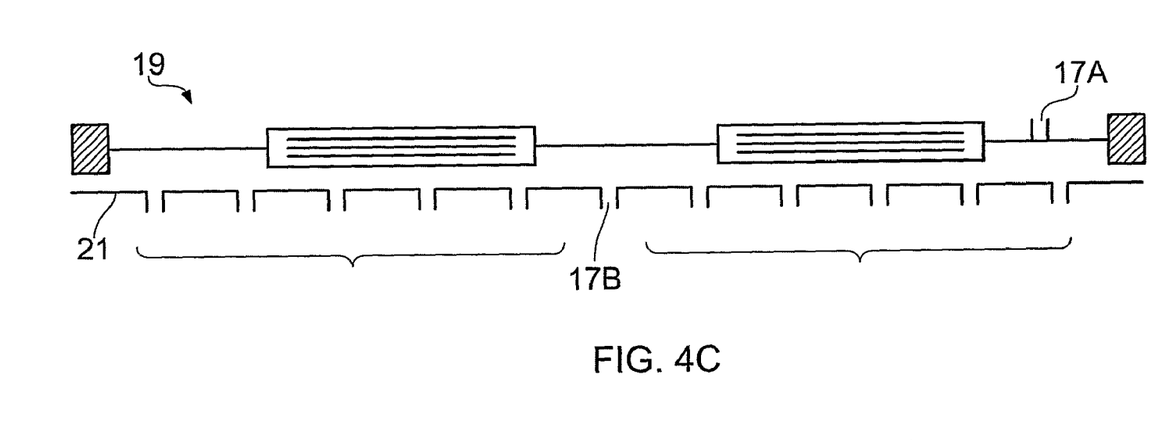
FIG. 4C is a schematic representation of the diaphragm pack of FIG. 4B placed in a double diaphragm forming apparatus with vacuum applied between the two diaphragms to consolidate the composite material.

FIG. 4C is illustrative of the diaphragm pack 19 placed inside a double diaphragm forming (DDF) apparatus. The vacuum port 17A is connected such that a vacuum is applied between the two diaphragms 15A, 15B, where the air inside the diaphragm pack 19 is evacuated or substantially evacuated. Further vacuum ports 17B may be provided in the bed of the DDF apparatus.

Figure 4D:
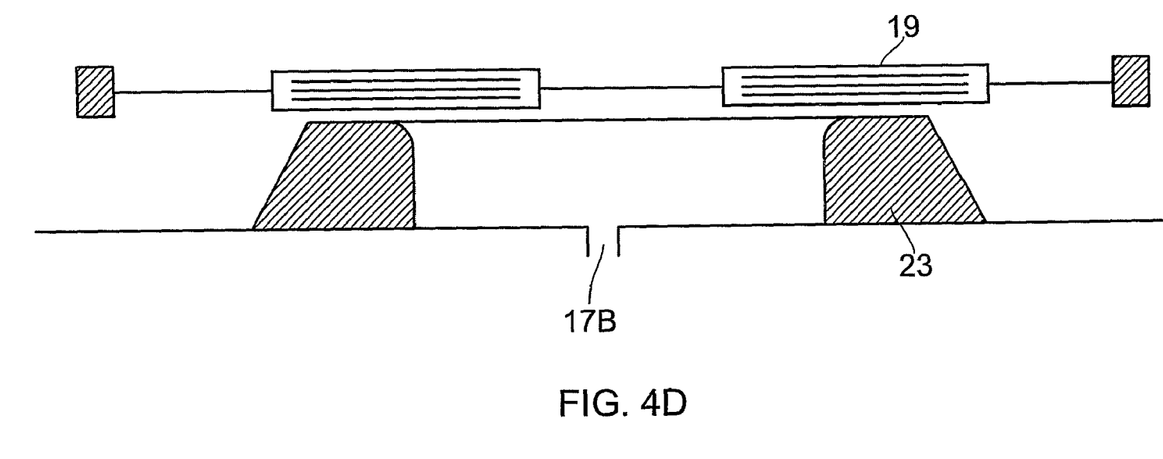
FIG. 4D is a schematic representation of the diaphragm pack being lowered into contact with a hollow forming tool.

Referring to FIG. 4D, the diaphragm pack 19 is placed upon a forming tool 23 about which the diaphragm pack 19 will deform to produce the end product.

Figure 4E:
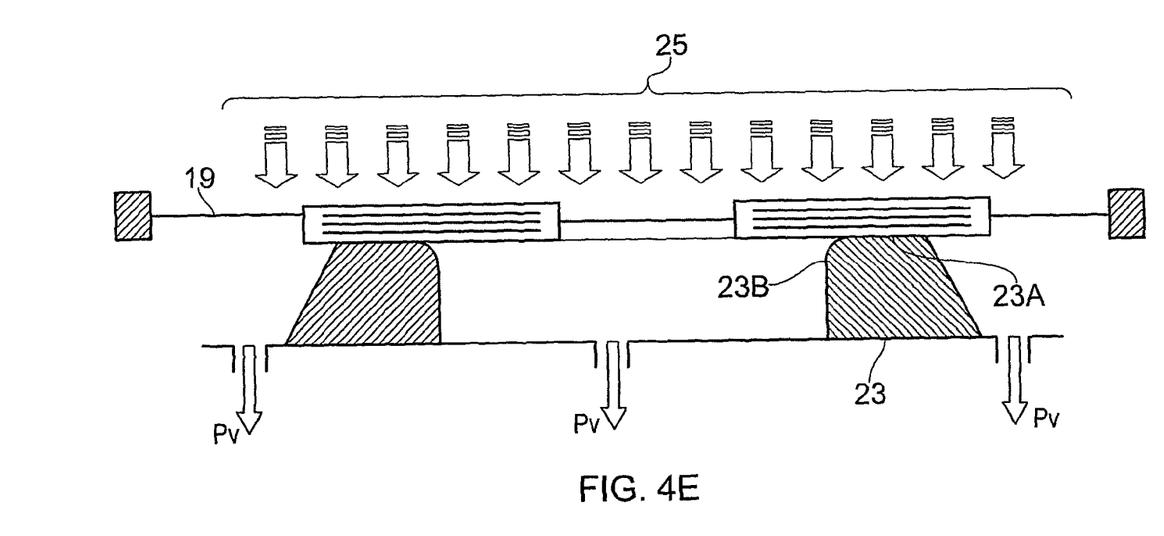
FIG. 4E is a schematic representation of an intermediate stage of the double diaphragm forming process, wherein the diaphragm pack is heated and vacuum is applied as the rim section of the diaphragm pack rests on the forming tool.

In FIG. 4E a set of arrows 25 is shown to represent heat applied from above within the DDF apparatus to commence the forming process, wherein the temperature of the resin in the composite stack 13 reaches a temperature at which the composite stack 13 can be formed into the shape of the forming tool 23.

In the illustrated example, the forming tool 23 has an upper surface 23A against which the first portion 9A of the tiles 9 rests and a bore 23B that comprises a vertical wall. The forming tool 23 is configured such that the first portion 9A of the tiles 9 is supported and the second portion 9B of the tiles 9 is unsupported; the only support for the central region is provided by the diaphragm pack 19 until it is heated and until vacuum is applied.

When the composite stack 13 within the diaphragm pack 19 reaches the desired temperature the diaphragm pack 19 is lowered into contact with the forming tool 23. Heat application 25 is continued from above such that the composite stack 13 is maintained at a substantially constant forming temperature. The forming tool 23 may also provide a heat source (not shown) that directly heats the diaphragm pack 19, thus helping to maintain the diaphragm pack 19 at a constant temperature.

Figure 4F:
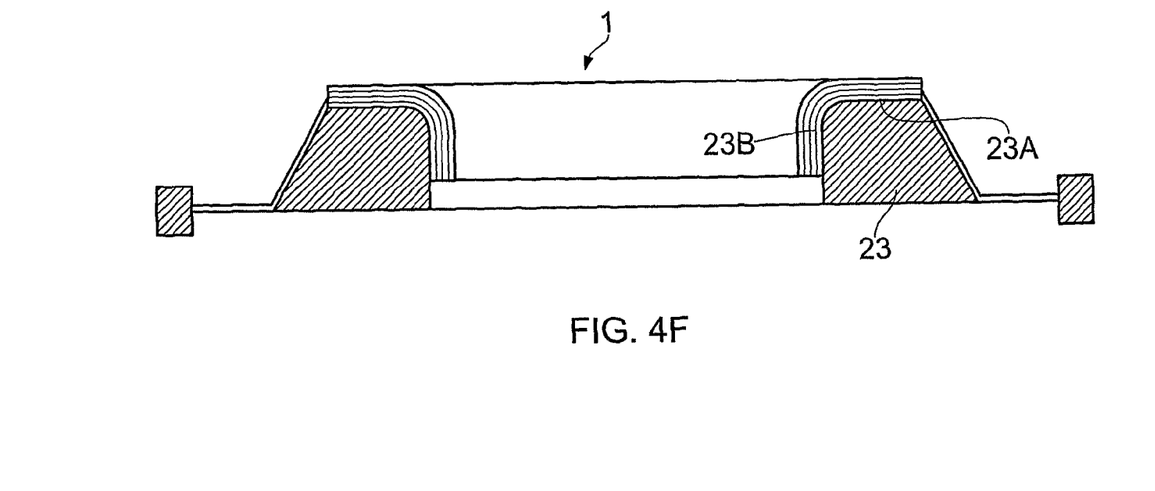
FIG. 4F is a schematic representation of applying a vacuum between the bottom diaphragm and the forming tool to draw the duct section of the composite material into contact with the internal wall of the forming tool to complete the forming process.

The next stage of the forming process, as illustrated in FIGS. 4E and 4F, involves applying a vacuum $P_V$ between the bottom diaphragm 15A, the forming tool 23 and the bed of the diaphragm forming apparatus, to evacuate air from the system and to draw the central region corresponding to the second portion 9B of the tiles 9 making up the composite stack 13 downwards into contact with the vertical wall of the forming tool 23. The outer periphery of the composite stack 13 that corresponds with the first portion 9A of the tiles 9 is drawn against the top surface 23A of the forming tool 23 to produce a three dimensional hollow composite structure 1.

The forming process transfers the second portion 9B of each tile 9 from a horizontal to vertical orientation. During the process the overlap between the side edges of the second portions 9B of adjacent tiles 9 in the flat stack 13 is removed and the side edges of the second portions 9B of the tiles 9 move to substantially abut against side edges of adjacent tiles. The composite material making up the flat stack in the diaphragm pack comprises resin, which may be impregnated into the fibres making up the composite material or may be included between the tile layers. On heating the diaphragm pack the resin softens and enables the second portion of the tiles to slide relative to each other into contact with the internal surface of the forming tool and so as the edges of adjacent tiles move from overlapping to abutting against side edges of adjacent tiles. Alternatively it is possible to lay up dry fibres with the addition of a binder or tackifier. This flat stack is then formed as described above to create a dry preform. Liquid resin can be injected into the dry preform.

Figures 5A, 5B, 5C:
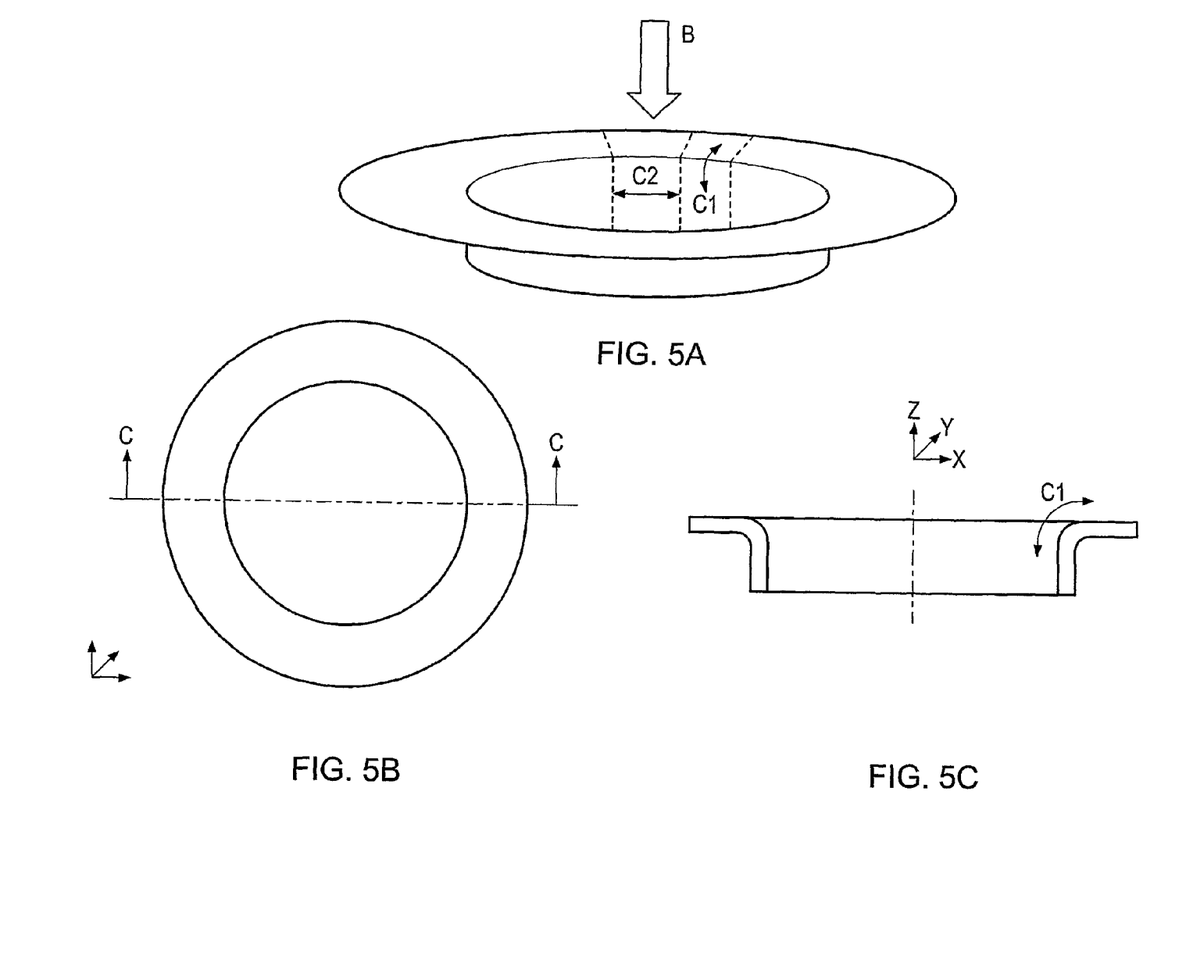
FIG. 5A is a perspective view of a hollow composite structure produced by the double diaphragm forming process illustrated by FIGS. 4A to 4F.
FIG. 5B is a plan view of the hollow composite structure of FIG. 5 viewed in the direction of arrow B.
FIG. 5C shows a cross-sectional view about section C-C of the composite structure of FIG. 5B.

Referring to FIGS. 5A, 5B and 5C the end product of the forming process illustrated and described with reference to FIGS. 4A to 4F is a hollow structure 1 that includes an integral flange 3. The end product produced by the process described above may be defined as a hollow composite structure 1 with double curvature. One element of the curvature C2 (see FIG. 5A) is defined by the circular periphery provided by the flange 3 and the second element of curvature C1 is the curve provided at the junction of the flange 3 with the cylindrical body 5. The curve C1 at the junction of the flange 3 with the cylindrical body 5 is due the thickness of the composite stack 13 that is being folded to produce the composite structure 1.

In the example described above, each tile 9 comprises a single ply of composite material. For example, each tile 9 may comprise unidirectional pre-impregnated material that contains for example aligned carbon fibres (examples of other suitable fibre types are described below). The use of unidirectional fibres offer the ability to place fibres in a component exactly where the reinforcement is required. In the example described, the fibres may be arranged to provide reinforcement in the two principal directions of a cylindrical structure; namely, some are laid in a direction tangential (zero degree fibre direction) to the circle around which the tiles 9 are laid and adjacent plies may be laid with the fibres in the radial direction (ninety degree fibre direction). Alternatively, instead of a pre-impregnated unidirectional fibre, a dry unidirectional stitched non-crimped fabric could be used. Resin can be introduced as a resin film interleaved between layers of fabric or as a liquid injected in a separate operation after forming the stack.

Other examples of suitable material are dry woven fabric only (produced by interlacing warp and weft fibres), dry woven fabric that is interleaved with resin film, or pre-impregnated woven fabric (where the fibres or the woven fabric is pre-impregnated with resin).

Polymer matrix composites, also known as fibre reinforced polymers are most suited to the method of production described above. Such materials use a polymer based resin as a matrix and a variety of fibres such as carbon, glass, or aramid as the reinforcement. When the resin system (for example epoxy or polyester) is combined with reinforcing fibres (such as carbon, aramid, glass or a combination of such reinforcements) exceptional properties may be obtained. The properties of the resulting composite material combines the properties of the resin system with the properties of the reinforcement material. The geometry of the fibres is also important in producing a composite structure with the correct mechanical properties.

Each of the tiles 9 described above is made of a composite material or fabric that may be defined as a manufactured assembly of long fibres of carbon, aramid, glass or a combination of these fibres that are held together for example by interlocking fibres (thy woven sheet) or with a secondary material to bind the fibres together (resin matrix). Hybrid fabrics that include more than one type of fibre may be used for the tiles. The reinforcement in each tile 9 may include carbon fibres only, aramid fibres only, glass fibres only. Alternatively, the reinforcement in each tile may combine two or more different reinforcement types to form each tile to produce a hybrid fabric. A combination of carbon and aramid fibres, glass and aramid fibres, carbon and glass fibres or a combination of carbon, aramid and glass fibres are examples of hybrid fabrics.

Figure 6:
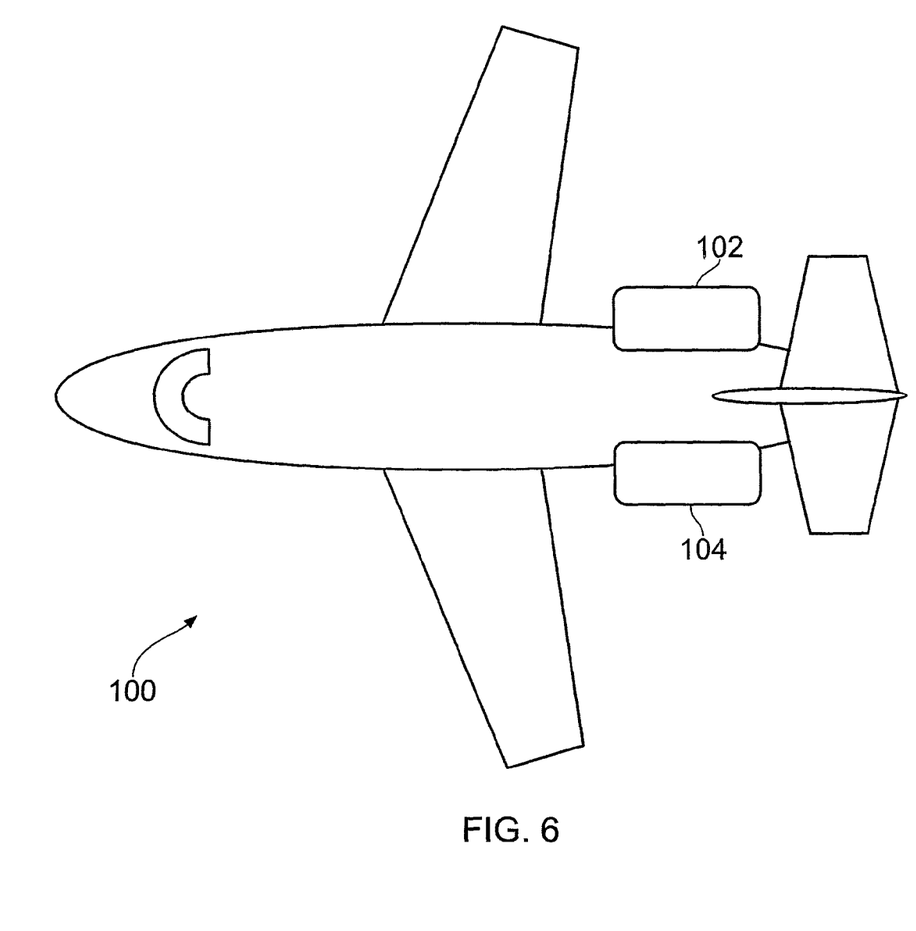
FIG. 6 is a schematic representation of an aircraft incorporating two engines.

An example application of a composite structure as described herein is in aircraft applications. For example, on a jet engine a composite structure may be used to replace metal flanges at the front and/or rear of an engine housing. Using a composite structure as discussed above may provide a weight saving and may also reduce the number of parts required compared with a metal housing and flange. For example, FIG. 6 is a schematic representation of an aircraft 100 including first and second engines 102 and 104 housed in engine casings.

Figure 7:
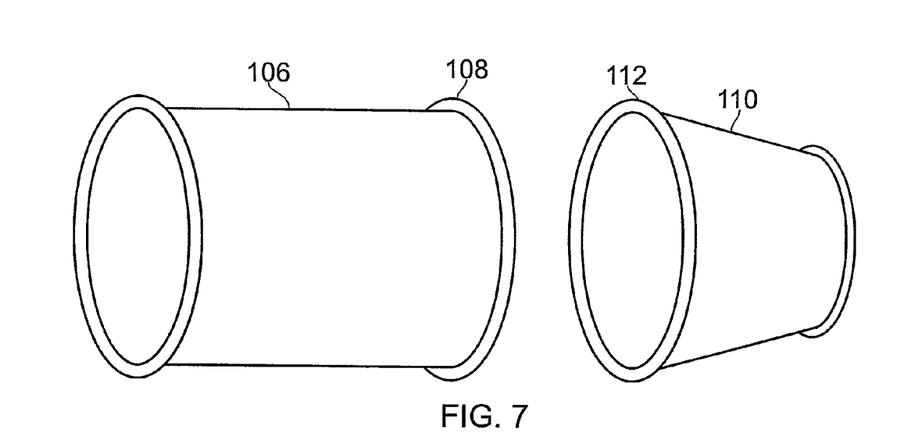
FIG. 7 is a schematic representation of two housing components for an aircraft engine.
Figure 8:
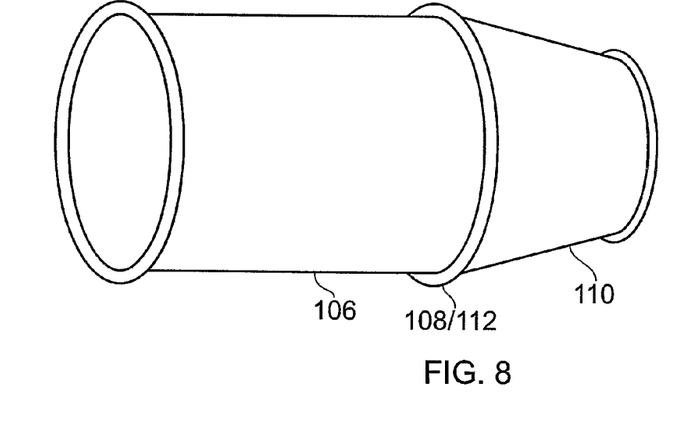
FIG. 8 is a schematic representation of the two parts joined at respective flanges.
Figure 9:
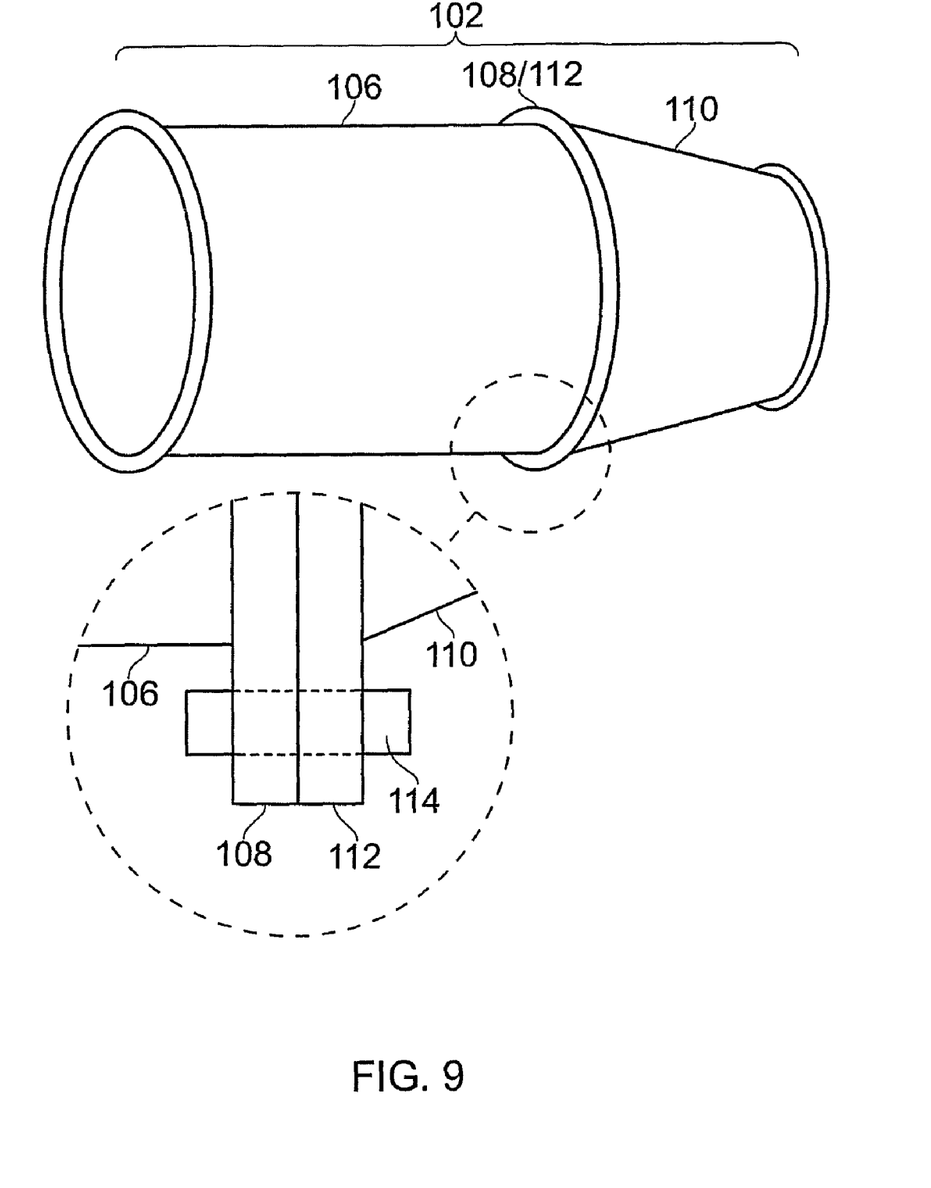
FIG. 9 is a schematic representation of a detail of the joining of the two parts at the flanges.

FIG. 7 is a schematic representation of an outer fan duct of a jet engine such as the engines 102 and 104 that comprises two sections, a first section 106 and a second section 110. The first section 106 is provided with a first flange 108 and the second section 110 is provided with a second flange 112. FIG. 8 illustrates the first section 106 joined to the second section 110 at the flanges 108 and 112. FIG. 9 illustrates this in more detail, in particular in the enlarged view, which shows the first flange 108 of the first section being joined to the second flange 112 of the second portion 110 by means of fastening members 114, which can, for example, be formed by bolts, rivets, etc.

It will be appreciated the representations in FIGS. 6-9 are schematic representations for illustrative purposes only, and that the present invention finds application to forming flanges on curved structures in aircraft and in other applications.

FIGS. 10A and 10B are further representations of ducts for an aircraft engine which are examples of suitable application for the composite structure described above. Each of the ducts illustrated are divided into sections A1, which represent separate hollow structures joined together at the flange. Flanges are also used to attach the duct to other concentric hollow structures that fit around it. It is evident from FIGS. 10A and 10B that the ducts are not constructed from parallel cylinders and that some sections are barrelled and some are tapered. Therefore, although the embodiment described above relates to a circular shaped duct, it will be appreciated that the product made from the described method could have a shape other than circular with parallel walls. For example, the duct could have an elliptical cross-section and/or the walls of the duct could be tapered or the walls of the duct could be barrel shaped. In, for example, a barrel shaped body the side edges of the second portion 9B of the composite tiles 9 may be straight or curved. The shape of the side edges of the first 9A and second 9B portions of the tiles are determined by the final form of the hollow structure to ensure that side edges of the second portion 9B of adjacent tiles abut when formed into the duct section of the composite structure.

Ducts and flanges having shapes other than curved may also be made by the method described above, for example, cross-sectional shapes that have angular edges for example hexagonal, octagonal etc. For such shapes the tile may have all straight edges.

Although the embodiments above have been described in detail, numerous variations and modifications will become apparent to those skilled in the art once the above disclosure is fully appreciated. It is intended that the following claims be interpreted to embrace all such variations and modifications as well as their equivalents.

The invention claimed is:

1. A method of making a composite structure comprising a curved body and an integral rim extending from an end of the curved body, the method comprises the steps:

forming a diaphragm pack comprising a flat stack of composite plies between two diaphragms wherein each ply of the flat stack is made up of a plurality of composite tiles, each tile having at least a first portion and a second portion, with side edges of the first portion being configured to abut against side edges of adjacent tiles and side edges of the second portion being configured to overlap side edges of adjacent tiles;

placing the diaphragm pack in a double diaphragm forming apparatus comprising a hollow forming tool including evacuating air from within the diaphragm pack, wherein the first portion of the composite tiles is supported on an upper surface of the tool;

applying heat to the diaphragm pack; and applying a vacuum between the lower diaphragm and the hollow forming tool such that: an unsupported region corresponding to the second portion of the composite tiles is drawn into contact with an internal wall of the forming tool; the edges of the second portion of adjacent tiles move to abut against side edges of adjacent tiles; the first portion of each tile forms part of the rim; and the second portion of each tile forms part of the curved body.

2. A method according to claim 1, wherein the side edges of the second portion of each tile is configured with substantially parallel edges.

3. A method according to claim 1, wherein each of the tiles laid is of substantially the same shape and size.

4. A method according to claim 1, wherein the side edges of the first portion of each tile are substantially radial.

5. A method according to claim 4, wherein the tiles are laid in a circular pattern.

6. A method according to claim 4, wherein the edges of adjacent tiles in each ply are offset from the edges of adjacent tiles in adjacent plies.

7. A method according to claim 1, wherein each tile comprises one ply of composite material.

8. A method according to claim 7, wherein the tiles include unidirectional pre-impregnated composite material.

9. A method according to claim 7, wherein the tiles include woven pre-impregnated material.

10. A method according to claim 7, wherein the tiles include dry fabric.

11. A method according to claim 10, wherein the dry fabric is woven fabric or a unidirectional stitched non-crimped fabric including binder or tackifier.

12. A method according to claim 10, wherein each ply of dry fabric when laid to form a composite stack is interleaved with resin film.

13. A method according to claims 7, wherein the composite material includes carbon fibres and/or aramid fibres and/or glass fibres.

14. A composite structure comprising a hollow duct and integral rim on an end thereof, wherein the duct and rim are formed from a plurality of composite tiles that include at least a first portion and a second portion, where the first portion of each tile forms part of the rim and the second portion of each tile forms part of the hollow duct and wherein edges of adjacent tiles abut one another, the composite structure being made by a method comprising the steps of:
forming a diaphragm pack comprising a flat stack of composite plies between two diaphragms wherein each ply of the flat stack is made up of a plurality of composite tiles, each tile having at least a first portion and a second portion, with side edges of the first portion being configured to abut against side edges of adjacent tiles and side edges of the second portion being configured to overlap side edges of adjacent tiles;
placing the diaphragm pack in a double diaphragm forming apparatus comprising a hollow forming tool including evacuating air from within the diaphragm pack, wherein the first portion of the composite tiles is supported on an upper surface of the tool;
applying heat to the diaphragm pack; and
applying a vacuum between the lower diaphragm and the hollow forming tool such that: an unsupported region corresponding to the second portion of the composite tiles is drawn into contact with an internal wall of the forming tool; the edges of the second portion of adjacent tiles move to abut against side edges of adjacent tiles; the first portion of each tile forms part of the rim; and the second portion of each tile forms part of the hollow duct.

15. A composite structure according to claim 14, wherein each tile is substantially mushroom-shaped, where the first portion is the head of the mushroom and the second portion forms the stalk of the mushroom shape.

16. A composite structure according to claim 14, wherein the duct and rim have a circular cross-section or oval cross section.

17. A composite structure according to claim 14, wherein the duct is an engine duct for an aircraft.

18. An aircraft engine comprising a composite structure or duct as claimed in claim 1.

19. A composite structure comprising a hollow duct and integral rim on an end thereof, wherein the duct and rim are formed from a plurality of composite tiles that include at least a first portion and a second portion, where the first portion of each tile forms part of the rim and the second portion of each tile forms part of the hollow duct and wherein edges of adjacent tiles abut one another.

20. A duct for an engine for an aircraft comprising a hollow duct and integral rim on an end thereof, wherein the duct and rim are formed from a plurality of composite tiles that include at least a first portion and a second portion, where the first portion of each tile forms part of the rim and the second portion of each tile forms part of the hollow duct and wherein edges of adjacent tiles abut one another.

21. A duct as claimed in claim 20 manufactured according to a method comprising the steps of:
forming a diaphragm pack comprising a flat stack of composite plies between two diaphragms wherein each ply of the flat stack is made up of a plurality of composite tiles, each tile having at least a first portion and a second portion, with side edges of the first portion being configured to abut against side edges of adjacent tiles and side edges of the second portion being configured to overlap side edges of adjacent tiles;
placing the diaphragm pack in a double diaphragm forming apparatus comprising a hollow forming tool including evacuating air from within the diaphragm pack, wherein the first portion of the composite tiles is supported on an upper surface of the tool;
applying heat to the diaphragm pack; and
applying a vacuum between the lower diaphragm and the hollow forming tool such that: an unsupported region corresponding to the second portion of the composite tiles is drawn into contact with an internal wall of the forming tool; the edges of the second portion of adjacent tiles move to abut against side edges of adjacent tiles; the first portion of each tile forms part of the rim; and the second portion of each tile forms part of the curved body.

* * * * *